US011942071B2

(12) United States Patent
Daido et al.

(10) Patent No.: US 11,942,071 B2
(45) Date of Patent: Mar. 26, 2024

(54) INFORMATION PROCESSING METHOD AND INFORMATION PROCESSING SYSTEM FOR SOUND SYNTHESIS UTILIZING IDENTIFICATION DATA ASSOCIATED WITH SOUND SOURCE AND PERFORMANCE STYLES

(71) Applicant: YAMAHA CORPORATION, Hamamatsu (JP)

(72) Inventors: Ryunosuke Daido, Hamamatsu (JP); Merlijn Blaauw, Barcelona (ES); Jordi Bonada, Barcelona (ES)

(73) Assignee: YAMAHA CORPORATION, Hamamatsu (JP)

( * ) Notice: Subject to any disclaimer, the term of this patent is extended or adjusted under 35 U.S.C. 154(b) by 149 days.

(21) Appl. No.: 17/307,322

(22) Filed: May 4, 2021

(65) Prior Publication Data

US 2021/0256960 A1 Aug. 19, 2021

Related U.S. Application Data

(63) Continuation of application No. PCT/JP2019/043510, filed on Nov. 6, 2019.

(30) Foreign Application Priority Data

Nov. 6, 2018 (JP) ................................ 2018-209288

(51) Int. Cl.
*G10L 13/047* (2013.01)
*G10L 13/02* (2013.01)
(Continued)

(52) U.S. Cl.
CPC ........ *G10L 13/047* (2013.01); *G10L 13/0335* (2013.01); *G10L 13/06* (2013.01);
(Continued)

(58) Field of Classification Search
CPC ......... G10L 13/10; G10L 13/06; G10L 13/02; G10L 13/0335; G10L 13/033
(Continued)

(56) References Cited

U.S. PATENT DOCUMENTS 6,304,846 B1 * 10/2001 George ................. G10L 13/033
704/E13.004
8,751,236 B1 * 6/2014 Fructuoso ............... G10L 13/06
704/266
(Continued)

FOREIGN PATENT DOCUMENTS

CN 104050961 A 9/2014
CN 104766603 A 7/2015
(Continued)

OTHER PUBLICATIONS

Patent Opposition in Japanese Patent Appln. No. 2018-209288 dated Feb. 10, 2021. English translation provided.
(Continued)

*Primary Examiner* — Farzad Kazeminezhad
(74) *Attorney, Agent, or Firm* — ROSSI, KIMMS & McDOWELL LLP

(57) ABSTRACT

An information processing system includes at least one memory storing a program and at least one processor. The at least one processor implements the program to input a piece of sound source data obtained by encoding a first identification data representative of a sound source, a piece of style data obtained by encoding a second identification data representative of a performance style, and synthesis data representative of sounding conditions into a synthesis model generated by machine learning, and to generate, using the synthesis model, feature data representative of acoustic features of a target sound of the sound source to be generated in the performance style and according to the sounding
(Continued)

conditions, and to generate an audio signal corresponding to the target sound using the generated feature data.

14 Claims, 7 Drawing Sheets

(51) Int. Cl.
*G10L 13/033* (2013.01)
*G10L 13/04* (2013.01)
*G10L 13/06* (2013.01)
*G10L 13/10* (2013.01)
(52) U.S. Cl.
CPC .............. *G10L 13/02* (2013.01); *G10L 13/04* (2013.01); *G10L 13/10* (2013.01)
(58) Field of Classification Search
USPC ............ 84/622; 704/266, 260, 268, E13.004
See application file for complete search history.

(56) References Cited

U.S. PATENT DOCUMENTS

| | | | | |
|---|---|---|---|---|
| 11,302,329 | B1 | 4/2022 | Sun et al. | |
| 11,551,663 | B1 | 1/2023 | Bissell et al. | |
| 2006/0136213 | A1* | 6/2006 | Hirose | G10L 13/033 704/260 |
| 2011/0000360 | A1* | 1/2011 | Saino | G10L 13/10 84/622 |
| 2011/0004476 | A1 | 1/2011 | Saino et al. | |
| 2013/0151256 | A1* | 6/2013 | Nakano | G10L 13/0335 704/268 |
| 2013/0262119 | A1 | 10/2013 | Latorre-Martinez | |
| 2015/0081306 | A1 | 3/2015 | Mori | |
| 2016/0012035 | A1 | 1/2016 | Tachibana et al. | |
| 2016/0140951 | A1* | 5/2016 | Agiomyrgiannakis | G10L 13/02 704/260 |
| 2021/0256959 | A1 | 8/2021 | Daido | |

FOREIGN PATENT DOCUMENTS

| | | | |
|---|---|---|---|
| EP | 3739477 | A1 | 11/2020 |
| JP | 2007240564 | A | 9/2007 |
| JP | 2015060002 | A | 3/2015 |
| JP | 2015172769 | A | 10/2015 |
| JP | 2016020972 | A | 2/2016 |
| JP | 2016114740 | A | 6/2016 |
| JP | 2017032839 | A | 2/2017 |
| JP | 2017045073 | A | 3/2017 |
| JP | 2017107228 | A | 6/2017 |
| JP | 2018146803 | A | 9/2018 |
| WO | 2019139431 | A1 | 7/2019 |

OTHER PUBLICATIONS

International Search Report issued in Intl. Appln. No. PCT/JP2019/043510 dated Jan. 21, 2020. English translation provided.
Written Opinion issued in Intl. Appln. No. PCT/JP2019/043510 dated Jan. 21, 2020. English translation provided.
International Preliminary Report on Patentability issued in in Intl. Appln. No. PCT/JP2019/043510 dated May 11, 2021. English translation provided.
Nose. “HMM-based speech synthesis with unsupervised labeling of accentual context based on F0 quantization and average voice model.” Conference Paper in Acoustics, Speech, and Signal Processing. Apr. 2010: 4622-4625.
Notice of Reasons for Revocation issued in Japanese Patent No. 6747489 dated Apr. 12, 2021. English machine ranslation provided.
Extended European Search Report issued in European Appln. No. 19882179.5 dated Aug. 25, 2022.
Nose. “HMM-based expressive singing voice synthesis with singing style control and robust pitch modeling.” Computer Speech and Language. 2015: 308-322. vol. 34, No. 1.
Office Action issued in Japanese Appln. No. 2020-133036 dated Jul. 5, 2022. English machine translation provided.
Yuhan “A Study on Representation of Speaker Information for DNN Speech Synthesis” technical research report for the Institute of Electronics Information and Communication Engineers, Aug. 2018: pp. 15 to 18. English abstract provided.
“What is Melodyne?” Celemony. <URL:https://www.celemony.com/en/melodyne/what-is-melodyne>, pp. 1-5. Cited in the U.S. Patent Publication No. 2.
International Search Report issued in Intl. Appln No. PCT/JP2019/043511 dated Jan. 21, 2020. English translation provided.
Written Opinion issued in Intl. Appln No. PCT/JP2019/043511 dated Jan. 21, 2020. English translation provided.
Extended European search report issued in European Appln. No. 19882740.4 dated Jul. 1, 2022.
MASE “HMM-based singing voice synthesis system using pitch-shifted pseudo training data”, Interspeech, 2010: pp. 845-848.
Blaauw “A Neural Parametric Singing Synthesizer Modeling Timbre and Expression from Natural Songs”, Applied Sciences, vol. 7, No. 12, Dec. 18, 2017: pp. 1-23.
Office Action issued in U.S. Appln. No. 17/306,123 dated May 8, 2023.
Office Action issued in Chinese Appln. No. 201980072998.7 dated Jun. 15, 2023. English machine translation provided.
Office Action issued in Chinese Appln. No. 201980072848.6 dated Jun. 19, 2023. English machine translation provided.
Office Action issued in Chinese Appln. No. 201980072998.7, dated Dec. 13, 2023. English translation provided.
Office Action issued in Chinese Appln. No. 201980072848.6, dated Jan. 6, 2024. English machine translation provided.

* cited by examiner

INFORMATION PROCESSING METHOD AND INFORMATION PROCESSING SYSTEM FOR SOUND SYNTHESIS UTILIZING IDENTIFICATION DATA ASSOCIATED WITH SOUND SOURCE AND PERFORMANCE STYLES

CROSS REFERENCE TO RELATED APPLICATIONS

This Application is a Continuation Application of PCT Application No. PCT/JP2019/043510, filed Nov. 6, 2019, and is based on and claims priority from Japanese Patent Application No. 2018-209288, filed Nov. 6, 2018, the entire contents of each of which are incorporated herein by reference.

BACKGROUND

Technical Field

The present disclosure relates to techniques for synthesizing sounds, such as voice sounds.

Description of Related Art

There are known in the art a variety of techniques for vocal synthesis based on phonemes. For example, Patent Document 1 (Japanese Patent Application Laid-Open Publication 2007-240564) discloses a unit-concatenating-type voice synthesis that generates a target sound, in which the target sound is a sound generated by concatenating voice units, and these voice units are freely selected in accordance with a target phonemes from voice units.

Recent speech synthesis techniques are required to synthesize a target sound that is vocalized by a variety of persons speaking in a variety of performance styles. However, to satisfy the requirement described above, the unit-concatenating-type voice synthesis techniques require preparation of voice units for each combination of a speaking persons and a performance style. This places too great a burden on preparation of voice units.

SUMMARY

An aspect of this disclosure has been made in view of the circumstance described above, and it has as an object to generate without voice units a variety of target sounds with different combinations of a sound source (e.g., a speaking person) and a performance style.

To solve the above problems, an information processing method according an aspect of the present disclosure is implemented by a computer, and includes inputting a first piece of sound source data representative of a first sound source, a first piece of style data representative of a first performance style, and first synthesis data representative of first sounding conditions into a synthesis model generated by machine learning; generating, using the synthesis model, first feature data representative of acoustic features of a first target sound of the first sound source to be generated in the first performance style and according to the first sounding conditions; and generating a first audio signal corresponding to the first target sound using the generated first feature data.

An information processing system according to an aspect of the present disclosure is an information processing system including at least one memory storing a program; and at least one processor that implements the program to: input a piece of sound source data representative of a sound source, a piece of style data representative of a performance style, and synthesis data representative of sounding conditions into a synthesis model generated by machine learning; generate, using the synthesis model, feature data representative of acoustic features of a target sound of the sound source to be generated in the performance style and according to the sounding conditions; and generate an audio signal corresponding to the target sound using the generated feature data.

A non-transitory medium according to an aspect of the present disclosure is a non-transitory medium storing a program executable by a computer to execute a method including inputting a piece of sound source data representative of a sound source, a piece of style data representative of a performance style, and synthesis data representative of sounding conditions into a synthesis model generated by machine learning; generating, using the synthesis model, feature data representative of acoustic features of a target sound of the sound source to be generated in the performance style and according to the sounding conditions; and generating an audio signal corresponding to the target sound using the generated feature data.

DESCRIPTION OF THE EMBODIMENTS

First Embodiment

Figure 1:
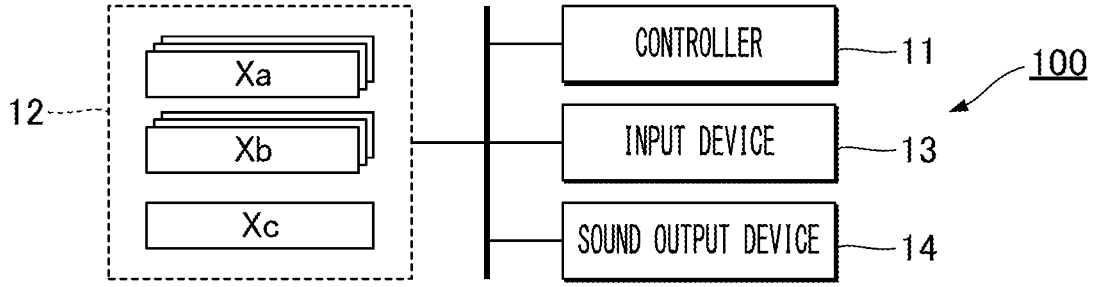
FIG. 1 is a block diagram showing an example of a configuration of an information processing system in an embodiment.

FIG. 1 is a block diagram showing an example of a configuration of an information processing system 100 in the first embodiment. The information processing system 100 is a voice synthesizer that generates a target voice of a tune virtually sung by a specific singer in a specific vocal style. A vocal style (an example of a "performance style") refers to a feature related to, for example, a way of singing. Examples of vocal styles include suitable ways of singing a tune for a variety of music genres, such as rap, R&B (rhythm and blues), or punk.

The information processing system 100 in the first embodiment is configured by a computer system including a controller 11, a memory 12, an input device 13 and a sound output device 14. In one example, an information terminal, such as a cell phone, a smartphone, a personal computer and other similar devices, may be used as the information processing system 100. The information processing system 100 may be a single device or may be a set of multiple independent devices.

The controller 11 includes one or more processors that control each element of the information processing system 100. The controller 11 includes one or more types of processors, examples of which include a Central Processing Unit (CPU), a Sound Processing Unit (SPU), a Digital Signal Processor (DSP), a Field Programmable Gate Array (FPGA), and an Application Specific Integrated Circuit (ASIC).

The input device 13 receives input operations made by the user. A user input element, or a touch panel that detects a touch of the user may be used as the input device 13. A voice-inputtable sound receiver may be applicable to the input device 13. The sound output device 14 plays back sound in response to an instruction from the controller 11. Typical examples of the sound output device 14 include a speaker and headphones.

The memory 12 refers to one or more memories configured by a known recording medium, such as a magnetic recording medium or a semiconductor recording medium. The memory 12 holds a program executed by the controller 11 and a variety of data used by the controller 11. The memory 12 may be configured by a combination of multiple types of recording medias. A portable memory medium detachable from the information processing system 100 or an online storage, which is an example of an external memory medium accessed by the information processing system 100 via a communication network, may be used as the memory 12. The memory 12 in the first embodiment holds Na pieces of singer data Xa, Nb pieces of style data Xb, and synthesis data Xc (each of Na and Nb is a natural number of two or more). The number Na of singing data Xa and the number Nb of style data Xb may be the same or different from each other.

The memory 12 in the first embodiment holds Na pieces of singer data Xa (an example of "sound-source data") corresponding to respective different singers. A piece of singer data Xa of each singer represents acoustic features (e.g., voice qualities) of a singing voice vocalized by the singer. The piece of singer data Xa in the first embodiment are represented as an embedding vector in a multidimensional first space. The first space is a continuous space, in which a position corresponding to each singer in the space is determined in accordance with the acoustic features of the singing voice of the singer. The more similar the acoustic features of a singing voice of a first singer to that of a singing voice of a second singer among the different singers, the closer the vector of the first singer and the vector of the second singer in the first space. As is clear from the foregoing description, the first space is described as a space representative of the relations between pieces of acoustic features of different singers relating to the singing voices. The user can make an appropriate input operation of the input device 13 to select any piece among the Na pieces of singer data Xa stored in the memory, that corresponds, to select a desired singer, among the singers. The generation of the singer data Xa will be described later.

The memory 12 in the first embodiment holds the Nb pieces of style data Xb corresponding to respective different vocal styles. A piece of style data Xb for each vocal style represents acoustic features of a singing voice vocalized in the vocal style. The piece of style data Xb in the first embodiment are represented as an embedding vector in a multidimensional second space. The second space is a continuous space, in which a position corresponding to each vocal style in the space is determined in accordance with the acoustic features of the singing voice vocalized in the vocal style. The more similar the acoustic features of a first vocal style to that of a second vocal style among the different vocal styles, the closer the vector of the first vocal style and the second vocal style in the second space. In other words, as is clear from the foregoing description, the second space is described as a space representative of the relations between pieces of acoustic features of different vocal styles relating to the singing voices. The user can make an appropriate input operation of the input device 13 to select any piece among the Nb pieces of style data Xb in the memory 12, that corresponds, to select a desired vocal style among the vocal styles. The generation of the style data Xb will be described later.

The synthesis data Xc specify a singing condition for the target sound. The synthesis data Xc in the first embodiment are a series of data specifying a pitch, a phonetic identifier (a pronounced letter) and a sound period, for each of notes included in the tune. The values of the control parameters, such as a volume for each note, may be specified by the synthesis data Xc. A file (SMF: Standard MIDI File) in a file format compliant with Musical Instrument Digital Interface (MIDI) standard is applicable to the synthesis data Xc.

Figure 2:
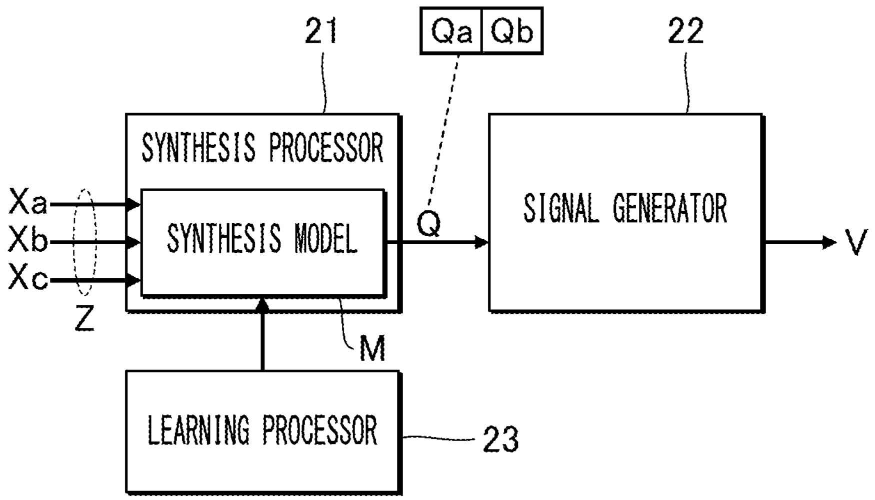
FIG. 2 is a block diagram showing an example of a functional configuration of the information processing system.

FIG. 2 is a block diagram showing an example of functions created by execution, by the controller 11, of a program stored in the memory 12. The controller 11 in the first embodiment creates a synthesis processor 21, a signal generator 22, and a learning processor 23. The functions of the controller 11 may be created by use of multiple independent devices. Some or all of the functions of the controller 11 may be created by electronic circuits therefor.

Synthesis Processor 21 and Signal Generator 22

The synthesis processor 21 generates a series of pieces of feature data Q representative of the acoustic features of the target sound. Each piece of feature data Q in the first embodiment includes a fundamental frequency (a pitch) Qa and a spectral envelope Qb of the target sound. The spectral envelope Qb is a contour of the frequency spectrum of the target sound. A piece of feature data Q is generated sequentially for each time unit of predetermined length (e.g., 5 milliseconds). In other words, the synthesis processor 21 in the first embodiment generates the series of the fundamental frequencies Qa and the series of the spectral envelopes Qb in the sequential pieces of feature data.

The signal generator 22 generates an audio signal V from the series of pieces of the feature data Q. In one example, a known vocoder technique is applicable to generation of the audio signal V by use of the series of the feature data Q. Specifically, in frequency spectrum corresponding to the fundamental frequency Qa, the signal generator 22 adjusts the intensity of each frequency in accordance with the spectral envelope Qb. Then the signal generator 22 converts the adjusted frequency spectrum into a time domain, to generate the audio signal V. Upon supplying the audio signal V generated by the signal generator 22 to the sound output device 14, the target sound is output as a sound wave from the sound output device 14. For convenience, illustration of a D/A converter is omitted in which a digital audio signal V is converted to an analog audio signal V.

In the first embodiment, a synthesis model M is used for generation of the feature data Q by use of the synthesis processor 21. The synthesis processor 21 inputs input data Z into the synthesis model M. The input data Z include (i) a piece of singer data Xa selected by the user from among the Na pieces of singer data Xa, (ii) a piece of style data Xb selected by the user from among the pieces of Nb style data Xb, and (iii) synthesis data Xc of tunes stored in the memory 12.

The synthesis model M is a statistical prediction model having learned relations between the input data Z and the feature data Q. The synthesis model M in the first embodiment is constituted by a deep neural network (DNN). Specifically, the synthesis model M is embodied by a combination of the following (i) and (ii): (i) a program (e.g., a program module included in artificial intelligence software) that causes the controller 11 to perform a mathematical operation for generating the feature data Q from the input data Z, and (ii) coefficients applied to the mathematical operation. The coefficients defining the synthesis model M are determined by machine learning (in particular, by deep learning) technique with training data, and then are stored in the memory 12. The machine learning of the synthesis model M will be described below.

Figure 3:
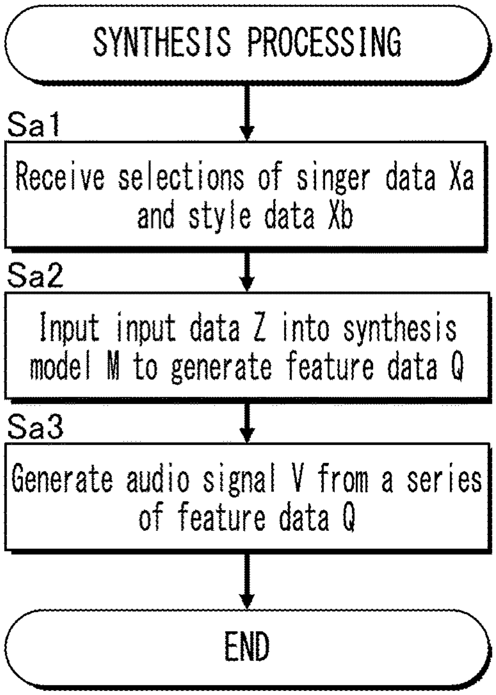
FIG. 3 is a flowchart showing an example of specific steps of synthesis processing.

FIG. 3 is a flowchart showing specific steps of synthesis processing, in which the audio signal V is generated by the controller 11 executing the synthesis processing in the first embodiment. Specifically, the synthesis processing is initiated by an instruction to the input device 13 from the user.

After the start of the synthesis processing, the synthesis processor 21 receives a selection of a piece of singer data Xa and a selection of a piece of style data Xb from the user (Sa1). In case where synthesis data Xc of plural tunes are stored in the memory 12, the synthesis processor 21 may receive a tune of synthesis data Xc selected by the user. The synthesis processor 21 inputs the input data Z into the synthesis model M to generate a series of pieces of feature data Q, wherein the input data include (i) the piece of singer data Xa and the piece of style data Xb selected by the user, and (ii) the synthesis data Xc of the tune stored in the memory 12 (Sa2). The signal generator 22 generates an audio signal V from the series of pieces of the feature data Q generated by the synthesis processor 21 (Sa3).

In the foregoing description, in the first embodiment, the feature data Q are generated by inputting a piece of singer data Xa, a piece of style data Xb, and the synthesis data Xc of the tune into the synthesis model M. This allows the target sound to be generated without voice units. In addition to a piece of singer data Xa and synthesis data Xc, a piece of style data Xb is input to the synthesis model M. It is possible to generate the feature data Q of various voice corresponding to combination of a selected singer and a selected vocal style, without preparation of a different piece of singer data Xa for each of the vocal styles, as compared with a configuration for generating the feature data Q in accordance with a piece of singer data Xa and synthesis data Xc. Specifically, by selecting different pieces of style data Xb to be selected together with a piece of singer data Xa, feature data Q of different target sounds, which are vocalized by a specific singer in different vocal styles, are generated. Furthermore, by changing different pieces of singer data Xa to be selected together with a piece of style data Xb, the feature data Q of different target sounds, which are vocalized by different singers in the same vocal style, are generated.

Learning Processor 23

Figure 4:
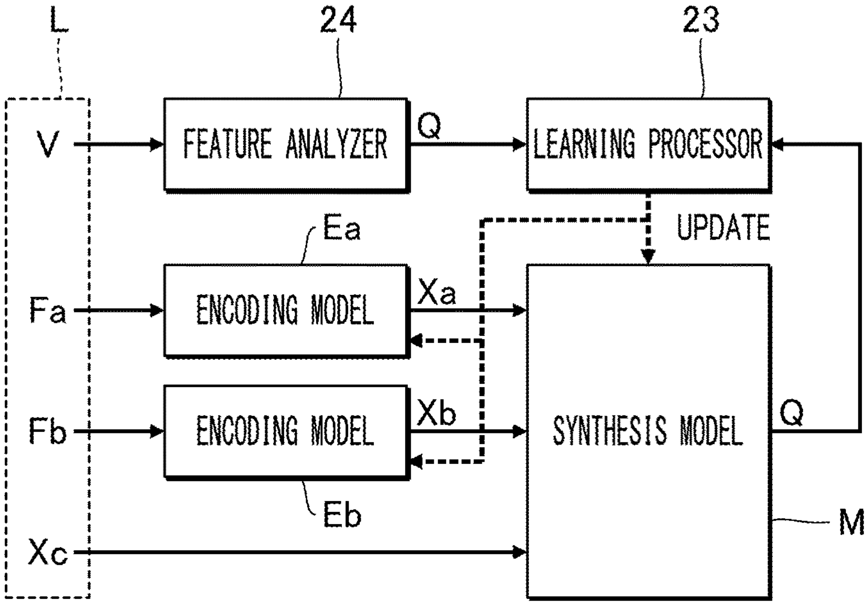
FIG. 4 is an explanatory drawing of a learning processing.

The learning processor 23 shown in FIG. 2 establishes the synthesis model M by machine learning. The synthesis model M well-trained by the learning processor 23 using the machine learning technique is applicable to the generation (hereinafter, referred to as "estimation processing") Sa2 of the feature data Q shown in FIG. 3. FIG. 4 is a block diagram for description of the machine learning technique carried out by the learning processor 23. Training data L stored in the memory 12 are used for the machine learning of the synthesis model M. Evaluation data L stored in the memory 12 are used for evaluation of the synthesis model M during the machine learning and determination of the end of the machine learning.

Each piece of training data L includes ID (identification) information Fa, ID (identification) information Fb, synthesis data Xc, and audio signal V. The ID information Fa refers to a series of numeric values for identifying a specific singer. Specifically, the ID information Fa has elements corresponding to respective different singers, and an element corresponding to a specific singer is set to a numeric value "1". The remaining elements are set to a numeric value "0". The series of numeric values according to one-hot representation is used as the ID information Fa of the specific singer. The ID information Fb is a series of numeric values for identifying a specific vocal style. Specifically, the ID information Fb has elements corresponding to respective vocal styles different from one another, and an element corresponding to a specific vocal style is set to a numeric value "1". The remaining elements are set to a numeric value "0". The series of numeric values according to one-hot representation is used as the ID information Fb of the specific vocal style. Instead, for the ID information Fa or Fb, one-cold expressions may be adopted, in which "1" and "0" expressed in the one-hot representation are switched to "0" and "1", respectively. For each piece of training data, different combinations of the piece of ID information Fa, the piece of ID information Fb and the synthesis data Xc may be provided. However, any of the piece of ID information Fa, the piece of ID information Fb, and the synthesis data Xc may be common between more than one piece of training data L.

The audio signal V included in any one piece of training data L represents a waveform of a singing voice of a tune represented by the synthesis data Xc, sang by a singer specified by the ID information Fa, in a vocal style specified by the ID information fb. In one example, the singing voice vocalized by the singer is recorded, and the recorded audio signal V is provided in advance.

The learning processor 23 in the first embodiment collectively trains an encoding model Ea and an encoding model Eb together with the synthesis model M, which is the main target of the machine learning. The encoding model Ea is an encoder that converts ID information Fa of a singer into a piece of singer data Xa of the singer. The encoding model Eb is an encoder that converts ID information Fb of a vocal style to a piece of style data Xb of the vocal style. The encoding models Ea and Eb each are constituted by, for example, a deep neural network. The synthesis model M receives supplies of the piece of singer data Xa generated by the encoding model Ea, the piece of style data Xb generated by the encoding model Eb, and the synthesis data Xc corresponding to the training data L. As described above, the synthesis model M outputs a series of pieces of the feature data Q in accordance with the piece of singer data Xa, the piece of style data Xb, and the synthesis data Xc.

The feature analyzer 24 extracts a series of pieces of feature data Q from the audio signal V of each piece of training data L. In one example, the extracted feature data Q includes a fundamental frequency Qa and a spectral envelope Qb of the audio signal V. The generation of a piece of feature data Q is repeated for each time unit (e.g., 5 milliseconds). In other words, the feature analyzer 24 generates a series of fundamental frequencies Qa and a series of spectral envelopes Qb from the audio signal V. The series of pieces of feature data Q corresponds to the ground-truth for the output of the synthesis model M.

Figure 5:
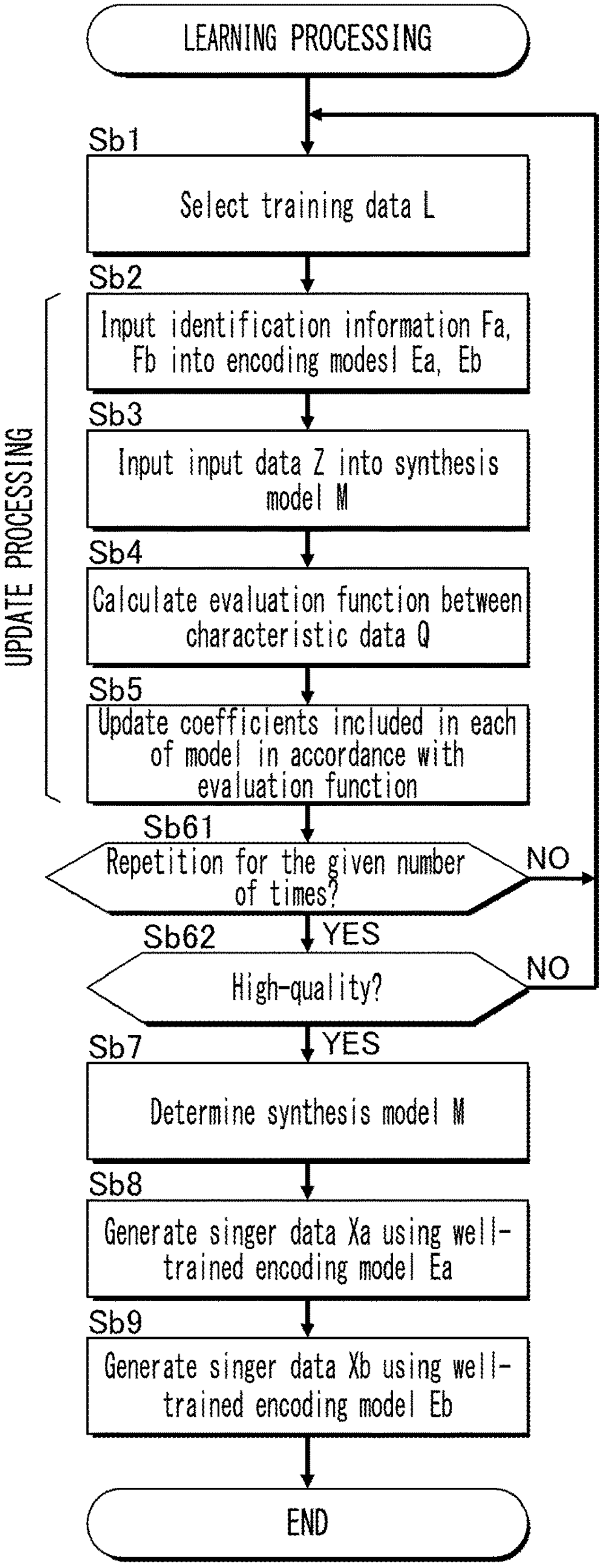
FIG. 5 is a flowchart showing an example of specific steps of the learning processing.

The learning processor 23 repeats to update the coefficients for each of the synthesis model M, the encoding model Ea, and the encoding model Eb. FIG. 5 is a flowchart showing concrete steps of a learning processing, carried out by the learning processor 23. Specifically, the learning processing is initiated by an instruction to the input device 13 from the user.

At the start of the learning processing, the learning processor 23 selects any piece of training data L stored in the memory 12 (Sb1). The learning processor 23 inputs ID information Fa of the selected piece of training data L from the memory 12 into a tentative encoding model Ea, and inputs ID information Fb of the piece of training data L into a tentative encoding model Eb (Sb2). The encoding model Ea generates a piece of singer data Xa corresponding to the ID information Fa. The encoding model Eb generates a piece of style data Xb corresponding to the ID information Fb.

The learning processor 23 inputs input data Z into a tentative synthesis model M, in which the input data Z include the piece of singer data Xa generated by the encoding model Ea, the piece of style data Xb generated by the encoding model Eb, and the synthesis data Xc corresponding to the training data L (Sb3). The synthesis model M generates a series of pieces of feature data Q in accordance with the input data Z.

The learning processor 23 calculates an evaluation function that represents an error between (i) the series of pieces of feature data Q generated by the synthesis model M, and (ii) the series of pieces of feature data Q (i.e., the correct value) generated by the feature analyzer 24 from the audio signals V of the training data L (Sb4). In one example, the evaluation function is used as inter-vector distances or cross entropy. The learning processor 23 updates the coefficients included in each of the synthesis model M, the encoding model Ea and the encoding model Eb, such that the evaluation function approaches a predetermined value (typically, zero) (Sb5). In one example, an error backpropagation method is used for updating the coefficients in accordance with the evaluation function.

The learning processor 23 determines whether the update processing described above (Sb2 to Sb5) has been repeated for a predetermined number of times (Sb61). If the number of repetitions of the update processing is less than the predetermined number (Sb61: NO), the learning processor 23 selects the next piece of training data L from the pieces of training data in the memory 12 (Sb1), and performs the update processing (Sb2 to Sb5) with the selected piece of training data L. In other words, the update processing is repeated for each piece of training data L.

If the number of times of the update processing (Sb2 to Sb5) reaches the predetermined value (Sb61: YES), the learning processor 23 determines whether the series of pieces of feature data Q generated by the synthesis model M after the update processing has reached the predetermined quality (Sb62). Evaluation of quality of the feature data Q is based on the aforementioned evaluation data L stored in the memory 12. Specifically, the learning processor 23 calculates the error between (i) the series of pieces of feature data Q generated by the synthesis model M from the evaluation data L, and (ii) the series of pieces of feature data Q (ground truth) generated by the feature analyzer 24 from the audio signal V of the evaluation data L. The learning processor 23 determines whether the feature data Q have reached the predetermined quality, based on whether the error between the feature data Q is below a predetermined threshold.

If the feature data Q have not yet reached the predetermined quality (Sb62: NO), the learning processor 23 starts the repetition of the update processing (Sb2 to Sb5) over the predetermined number of times. As is clear from the above description, the qualities of the feature data Q are evaluated for each repetition of the update processing over the predetermined number of times. If the feature data Q have reached the predetermined quality (Sb62: YES), the learning processor 23 determines the synthesis model M at this stage as the final synthesis model M (Sb7). In other words, the coefficients after the latest update are stored in the memory 12 as the well-trained synthesis model. M. The well-trained synthesis model M determined in the above steps is used in the estimation processing Sa2 described above.

As is clear from the foregoing description, the well-trained synthesis model M can generate a series of pieces of feature data Q statistically proper for unknown input data Z, under latent tendency between (i) the input data Z corresponding to the training data L, and (ii) the feature data Q corresponding to the audio signal V of the training data L. In other words, the synthesis model M learns the relations between the input data Z and the feature data Q.

The encoding model Ea learns the relations between the ID information Fa and the singer data Xa such that the synthesis model M generates feature data Q statistically proper for the input data Z. The learning processor 23 inputs each piece of Na ID information Fa into the well-trained encoding model Ea, to generate Na pieces of singer data Xa (Sb8). The Na pieces of singer data Xa generated by the encoding model Ea in the above steps are stored in the memory 12 for the estimation processing Sa2. At the stage of storing the Na pieces of singer data Xa, the well-trained encoding model Ea is no longer needed.

Similarly, the encoding model Eb learns the relations between the ID information Fb and the style data Xb such that the synthesis model M generates feature data Q statistically proper for the input data Z. The learning processor 23 inputs each of Nb ID information Fb into the well-trained encoding model Eb, to generate Nb pieces of style data Xb (Sb9). The Nb pieces of style data Xb generated by the encoding model Eb in the above steps are stored in the memory 12 for the estimation processing Sa2. At the stage of storing the Nb pieces of style data Xb, the well-trained encoding model Eb is no longer needed.

Generation of New Singer Data Xa for a New Singer

After the generation of the Na pieces of singer data Xa by use of the well-trained encoding model Ea, the encoding model Ea is no longer needed. For this reason, the encoding model Ea is discarded after the generation of the Na pieces of singer data Xa. However, generation of a piece of singer data Xa for a new singer may be required later. The new singer refers to a singer whose singer data Xa has not been generated yet. The learning processor 23 in the first embodiment generates a piece of singer data Xa for the new singer by use of training data Lnew corresponding to the new singer, and the well-trained synthesis model M.

Figure 6:
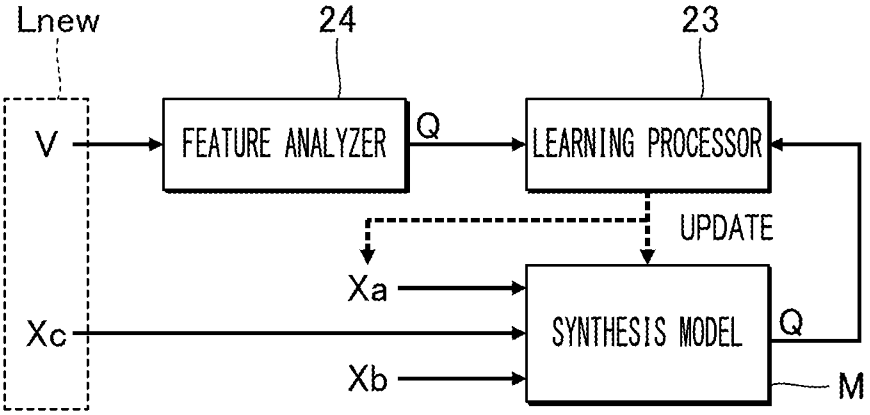
FIG. 6 is an explanatory drawing of a supplement processing.

FIG. 6 is an explanatory drawing of supplement processing, which is carried out by the learning processor 23, to generate singer data Xa for new singers. Each piece of training data Lnew includes (i) an audio signal V representative of a singing voice of a tune, sang by the new singer in a specific vocal style, and (ii) synthesis data Xc (an example of "new synthesis data") corresponding to the tune. The singing voice vocalized by the new singer is recorded, and the recorded audio signal V is provided for the training data Lnew in advance. The feature analyzer 24 generates a series of pieces of feature data Q from the audio signal V of each pieces of training data Lnew. In addition, a piece of singer data Xa as a variable to be trained is supplied to the synthesis model M.

Figure 7:
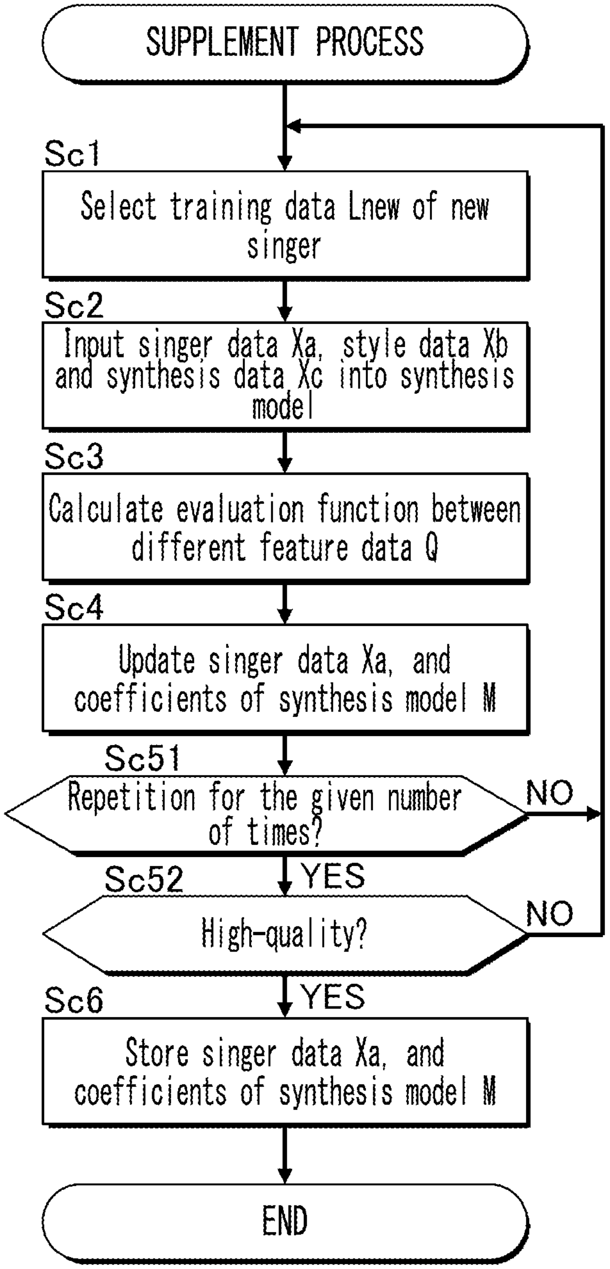
FIG. 7 is a flowchart showing specific steps of the supplement processing.

FIG. 7 is a flowchart showing an example of concrete steps of the supplement processing. At the start of the supplement processing, the learning processor 23 selects any piece of pieces of training data Lnew stored in the memory 12 (Sc1). The learning processor 23 inputs, into the well-trained synthesis model M, the following data: a piece of initialized singer data Xa (an example of "new sound source data"), a piece of existing style data Xb corresponding to a vocal style of the new singer, and synthesis data Xc corresponding to the selected piece of data Lnew stored in the memory 12 (Sc2). The initial values of the singer data Xa are set to, for example, random numbers. The synthesis model M generates feature data Q (an example of "new feature data") in accordance with the piece of style data Xb and the piece of synthesis data Xc.

The learning processor 23 calculates an evaluation function that represents an error between (i) the series of pieces of feature data Q generated by the synthesis model M, and (ii) the series of pieces of feature data Q (ground truth) generated by the feature analyzer 24 from the audio signal V of the training data Lnew (Sc3). The feature data Q generated by the feature analyzer 24 is an example of "known feature data". The learning processor 23 updates the piece of singer data Xa and the coefficients of the synthesis model M such that the evaluation function approaches the predetermined value (typically, zero) (Sc4). The piece of singer data Xa may be updated such that the evaluation function approaches the predetermined value, while maintaining the coefficients of the synthesis model M fixed.

The learning processor 23 determines whether the additional updates (Sc2 to Sc4) described above have been repeated for the predetermined number of times (Sc51). If the number of additional updates is less than the predetermined number (Sc51: NO), the learning processor 23 selects the next piece of training data Lnew from the memory 12 (Sc1), and executes the additional updates (Sc2 to Sc4) with the piece of training data Lnew. In other words, the additional update is repeated for each piece of training data Lnew.

If the number of additional updates (Sc2 to Sc4) reaches the predetermined value (Sc51: YES), the learning processor 23 determines whether the series of pieces of feature data Q generated by the synthesis model M after the additional update have reached the predetermined quality (Sc52). To evaluate the qualities of the feature data Q, the evaluation data L are used as in the previous example. If the feature data Q have not reached the predetermined quality (Sc52: NO), the learning processor 23 starts the repetition of the additional update (Sc2 to Sc4) over the predetermined number of times. As is clear from the description above, the qualities of the feature data Q are evaluated for each repetition of the additional update over the predetermined number of times. If the feature data Q reach the predetermined quality (Sc52: YES), the learning processor 23 stores, as established values, the updated coefficients and the updated pieces of singer data Xa in the memory 12 (Sc6). The singer data Xa of the new singer are applied to the synthesis processing for synthesizing the singing voice vocalized by the new singer.

The synthesis model M before the supplement processing already has been trained by use of the pieces of learning data L of a variety of singers. Accordingly, it is possible for the synthesis model after the supplement processing to generate a variety of target sounds for a new singer even if a sufficient amount of training data Lnew of the new singer cannot be provided. Specifically, as for a pitch and a phonetic identifier for which no piece of training data Lnew of a new singer is provided, it is possible for the synthesis model to robustly generate high-quality target sound by use of the well-trained synthesis model M. In other words, it is possible for the synthesis model to generate the target sounds for a new singer without sufficient training data Lnew (e.g., training data including voices of all kinds of phonemes) of the new singer.

If a synthesis model M has been trained by use of training data L of a single singer, the re-training of the synthesis model M by use of training data Lnew of another new singer may changes the coefficients of the synthesis model M significantly. The synthesis model M in the first embodiment has been trained by use of the training data L of a large number of singers. Therefore, the re-training of the synthesis model M by use of the training data Lnew of new singer doesn't change the coefficients of the synthesis model M significantly.

Second Embodiment

The second embodiment will be described. In each of the following examples, for elements having functions that are the same as those of the first embodiment, reference signs used in the description of the first embodiment will be used, and detailed description thereof will be omitted as appropriate.

Figure 8:
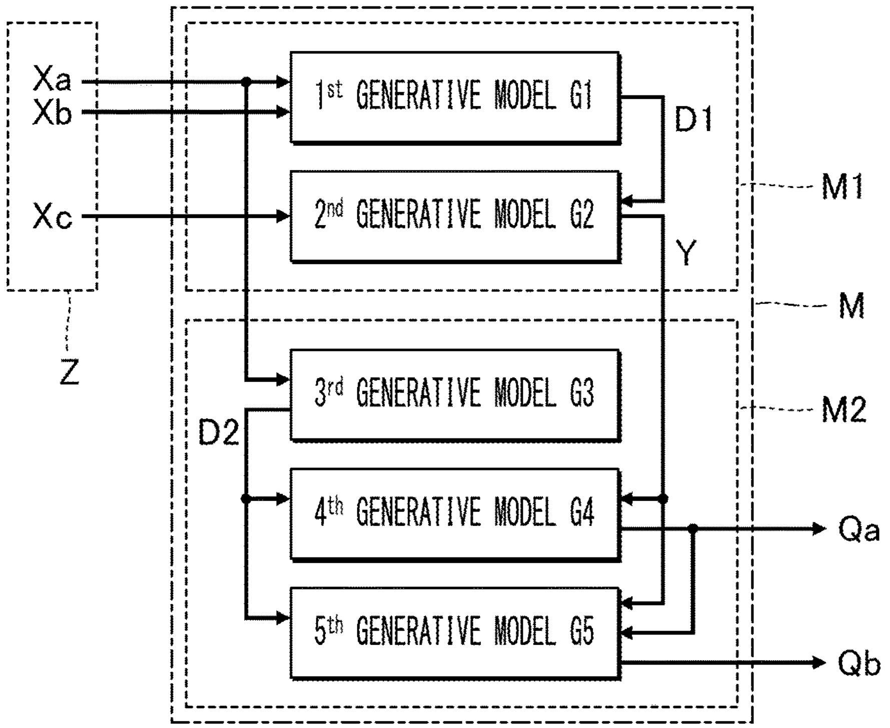
FIG. 8 is a block diagram showing an example of a configuration of a synthesis model in a second embodiment.

FIG. 8 is a block diagram showing an example of a configuration of a synthesis model M in the second embodiment. The synthesis model M in the second embodiment includes a first well-trained model M1 and a second well-trained model M2. The first well-trained model M1 is constituted by a recurrent neural network (RNN), such as Long Short Term Memory (LSTM). The second well-trained model M2 is constituted by, for example, a Convolutional Neural Network (CNN). The first well-trained model M1 and the second well-trained model M2 have coefficients that have been updated by machine learning by use of training data L.

The first well-trained model M1 generates intermediate data Y in accordance with input data Z including singer data Xa, style data Xb, and synthesis data Xc. The intermediate data Y represent a series of respective elements related to singing of a tune. Specifically, the intermediate data Y represent a series of pitches (e.g., note names), a series of volumes during the singing, and a series of phonemes. In other words, the intermediate data Y represent changes in pitches, volumes, and phonemes over time when a singer represented by the singer data Xa sings the tune represented by the synthesis data Xc in a vocal style represented by the style data Xb.

The first well-trained model M1 in the second embodiment includes a first generative model G1 and a second generative model G2. The first generative model G1 generates expression data D1 from the singer data Xa and the style data Xb. The expression data D1 represent feature of musical expression of a singing voice. As is clear from the above description, the expression data D1 are generated in accordance with combinations of the singer data Xa and the style data Xb. The second generative model G2 generates the intermediate data Y in accordance with the synthesis data Xc stored in the memory 12 and the expression data D1 generated by the first generative model G1.

The second well-trained model M2 generates the feature data Q (a fundamental frequency Qa and a spectral envelope Qb) in accordance with the singer data Xa stored in the memory 12 and the intermediate data Y generated by the first well-trained model M1. As shown in FIG. 8, the second well-trained model M2 includes a third generative model G3, a fourth generative model G4, and a fifth generative model G5.

The third generative model G3 generates physical data D2 in accordance with the singer data Xa. The physical data D2 represent feature of the singer's pronunciation mechanism (e.g., vocal cords) and articulatory mechanism (e.g., a vocal tract). Specifically, the physical data D2 represent the frequency feature assigned to a singing voice by the singer's pronunciation mechanism and articulatory mechanism.

The fourth generative model G4 (an example of "first generative model") generates a series of the fundamental frequencies Qa of the feature data Q in accordance with the intermediate data Y generated by the first well-trained model M1, and the physical data D2 generated by the third generative model G3. The fifth generative model G5 (an example of "second generative model") generates a series of the spectral envelopes Qb of the feature data Q in accordance with (i) the intermediate data Y generated by the first well-trained model M1, (ii) the physical data D2 generated by the third generative model G3, and (iii) the series of the fundamental frequency Qa generated by the fourth generative model G4. In other words, the fifth generative model G5 generates the series of the spectral envelopes Qb of the target sound in accordance with the series of the fundamental frequencies Qa generated by the fourth generative model G4. The signal generator 22 receives a supply of the series of the feature data Q including the fundamental frequency Qa generated by the fourth generative model G4 and the spectral envelope Qb generated by the fifth generative model G5.

In the second embodiment, the same effect as that of the first embodiment is realized. Furthermore, in the second embodiment, the synthesis model M includes the fourth generative model G4 generating the series of the fundamental frequencies Qa, and the fifth generative model G5 generating the series of the spectral envelopes Qb. Accordingly, it provides explicit learning of the relations between the input data Z and the series of the fundamental frequencies Qa.

Third Embodiment

Figure 9:
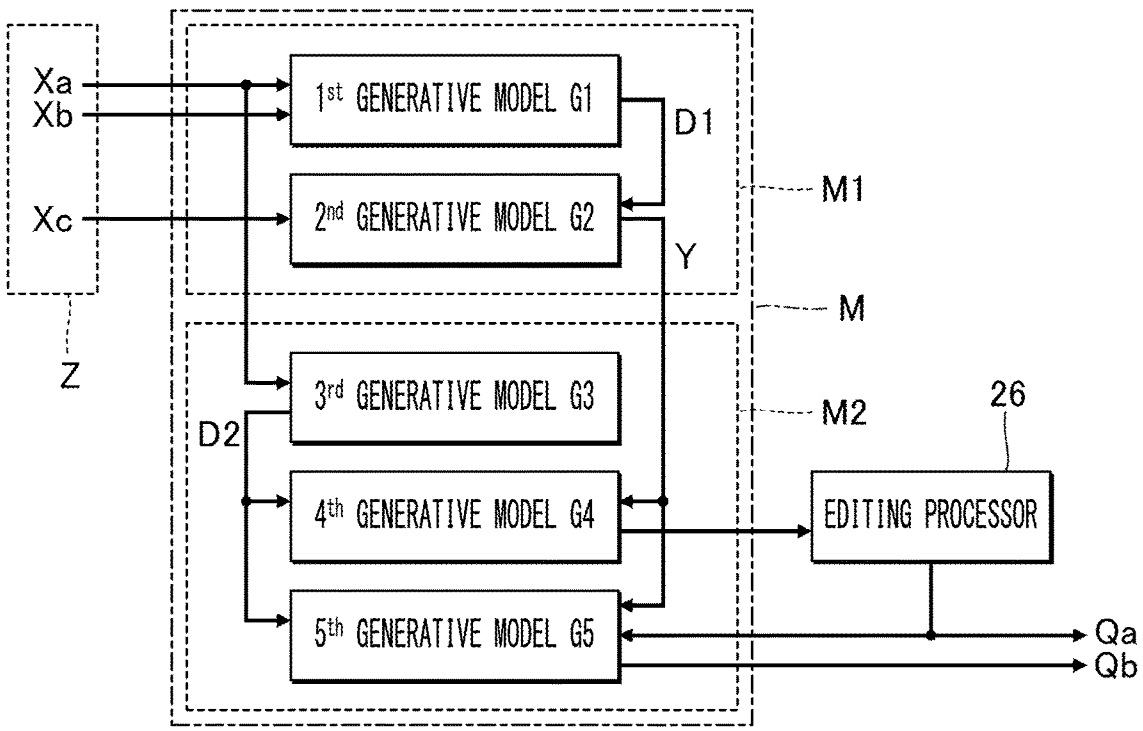
FIG. 9 is a block diagram showing an example of a configuration of a synthesis model in a third embodiment.

FIG. 9 is a block diagram showing an example of a configuration of the synthesis model M in the third embodiment. The configuration of the synthesis model M in the third embodiment is the same as that in the second embodiment. In other words, the synthesis model M in the third embodiment includes the fourth generative model G4 generating the series of the fundamental frequencies Qa, and the fifth generative model G5 generating the series of spectral envelopes Qb.

The controller 11 in the third embodiment acts as an editing processor 26 shown in FIG. 9, in addition to the same elements as in the first embodiment (the synthesis processor 21, the signal generator 22, and the learning processor 23). The editing processor 26 edits the series of the fundamental frequencies Qa generated by the fourth generative model G4 in response to an instruction to the input device 13 from the user.

The fifth generative model G5 generates the series of the spectral envelopes Qb of the feature data Q in accordance with (i) the series of the intermediate data Y generated by the first well-trained model M1, (ii) the physical data D2 generated by the third generative model G3, and (iii) the series of the basic frequencies Qa after the editing by the editing processor 26. The signal generator 22 receives a supply of the series of the feature data Q including the edited fundamental frequencies Qa by the editing processor 26 and the spectral envelope Qb generated by the fifth generative model G5.

In the third embodiment, the same effect as that of the first embodiment is realized. Furthermore, in the third embodiment, the series of the spectral envelopes Qb are generated in accordance with the series of the edited fundamental frequencies Qa in response to an instruction from the user. Accordingly, it is possible to generate a target sound in which the user's intention is reflected in temporal transitions of the fundamental frequency Qa.

Modifications

Examples of specific modifications to be made to the foregoing embodiments will be described below. Two or more modifications freely selected from among the examples below may be appropriately combined as long as they do not conflict with each other.

Figure 10:
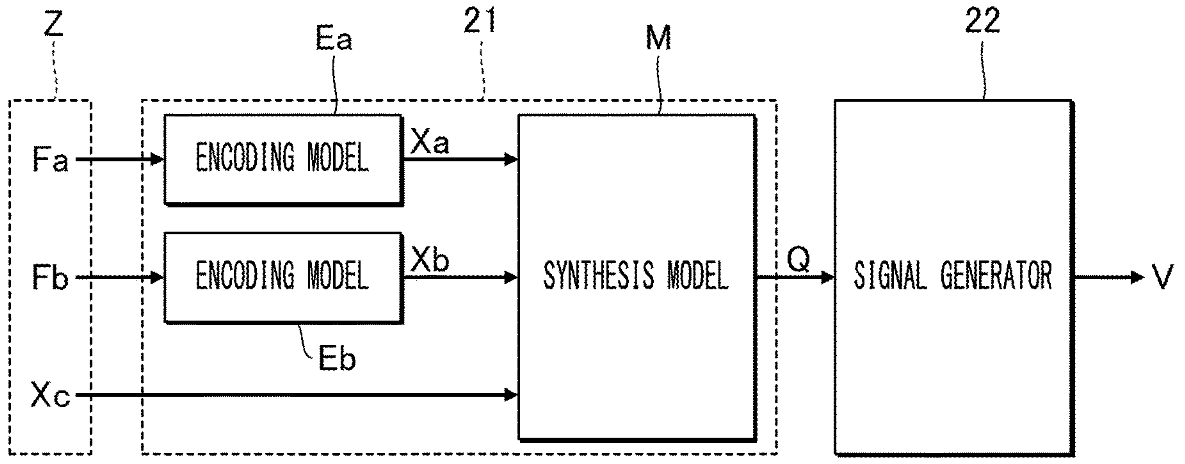
FIG. 10 is an explanatory drawing of a synthesis processing in a modification.

(1) In each foregoing embodiment, the encoding models Ea and Eb are discarded after training of the synthesis model M. However, as shown in FIG. 10, the encoding models Ea and Eb may be used for synthesis processes together with the synthesis model M. In the configuration shown in FIG. 10, input data Z include ID information Fa of a singer, ID information Fb of a vocal style, and synthesis data Xc. The synthesis model M receives inputs of the following data: the singer data Xa generated by the encoding model Ea from the ID information Fa, the style data Xb generated by the encoding model Eb from the ID information Fb, and the synthesis data Xc included in the input data Z.

(2) In each of the foregoing embodiment, an example is described in which the configuration in which the feature data Q includes the fundamental frequency Qa and the spectral envelope Qb. However, the feature data Q are not limited to the foregoing examples. In one example, a variety of data representative of features of a frequency spectrum (hereinafter, referred to as "spectral feature") may be used as the feature data Q. Examples of the spectral feature available as the feature data Q include Mel Spectrum, Mel Cepstral, Mel Spectrogram and a spectrogram, in addition to the foregoing spectral envelopes Qb. In a configuration in which a spectral feature for identifying fundamental frequencies Qa is used as feature data Q, the fundamental frequencies Qa may be excluded from the feature data Q.

(3) In the each foregoing embodiment, new singer data Xa are generated by the supplement processing for new singers. However, methods of generating the singer data Xa are not limited to the foregoing examples. In one example, singer data Xa may be interpolated or extrapolated to generate new singer data Xa. A piece of singer data Xa of a singer A and a piece of singer data Xa of a singer B can be interpolated to generate a piece of singer data Xa of a virtual singer who sings with a intermediate voice quality between the singer A and the singer B.

(4) In each foregoing embodiment, an information processing system 100 is illustrated, which includes both the synthesis processor 21 (and the signal generator 22) and the learning processor 23. However, the synthesis processor 21 and the learning processor 23 may be installed in a separate information processing system. The information processing system including the synthesis processor 21 and the signal generator 22 is created as a speech synthesizer that generates an audio signal V from input data Z. The learning processor 23 may be or may not be provided in the speech synthesizer. Furthermore, the information processing system that includes the learning processor 23 is created as a machine learning device in which synthesis model M is generated by machine learning using training data L. The synthesis processor 21 may be or may not be provided in the machine learning device. The machine learning device may be configured as a server apparatus communicable with a terminal apparatus, and the synthesis model M generated by the machine learning device may be distributed to the terminal apparatus. The terminal apparatus includes the synthesis processor 21 which executes synthesis processing by use of the synthesis model M distributed by the machine learning device.

(5) In each foregoing embodiment, singing voices vocalized by singers are synthesized. However, the present disclosure also applies to the synthesis of various sounds other than singing voices. In one example, the disclosure also applies to synthesis of general voices, such as a spoken voices that do not require music, as well as synthesis of musical sounds produced by musical instruments. The piece of singer data Xa corresponds to an example of a piece of sound source data representative of a sound source, the sound sources including speaking persons or musical instruments and the like, in addition to singers. Style data Xb comprehensively represent performance styles that includes speech styles or styles of playing musical instruments, in addition to vocal styles. Synthesis data Xc comprehensively represent sounding conditions including speech conditions (e.g., phonetic identifiers) or performance conditions (e.g., a pitch and a volume for each note) in addition to singing conditions. The synthesis data Xc for the performances of musical instruments don't include phonetic identifiers.

The performance style (sound-output conditions) represented by style data Xb can include a sound-output environment and a recording environment. The sound-output environment refers to an environment, such as, an anechoic room, a reverberation room, outdoors, or the like. The recording environment refers to an environment, such as, recording using digital equipment or an analog tape media. The encoding model or the synthesis model M is trained by use of training data L, which include audio signals V in different sound-output or recording environments.

Venues for performances as well as equipments for recording correspond to music genres of respective eras. In this regard, the performance style represented by style data Xb can indicate the sound-output environment or the recording environment. More specifically, the sound-output environment may indicate "sound produced in an anechoic room", "sound produced in a reverberation room", or "sound produced outdoors" and other similar places. The recording environment may indicate "sound recorded on digital equipment", "sound recorded on an analog tape media" and the like.

(6) The functions of the information processing system 100 in each foregoing embodiment are realized by collaboration between a computer (e.g., a controller 11) and a program. The program according to one aspect of the present disclosure is provided in a form stored on a computer-readable recording medium and is installed on a computer. The recording medium is a non-transitory recording medium, a typical example of which is an optical recording medium (an optical disk), such as a CD-ROM. However, examples of the recording medium include any known form of recording medium, such as a semiconductor recording medium or a magnetic recording medium. Examples of the non-transitory recording media include any recording media except for transitory and propagating signals, and does not exclude volatile recording medias. The program may be provided to a computer in the form of distribution over a communication network.

(7) The entity that executes artificial intelligence software to realize the synthesis model M is not limited to a CPU. Specifically, the artificial intelligence software may be executed by a processing circuit dedicated to neural networks, such as a Tensor Processing Unit or a Neural Engine, or by any Digital Signal Processor (DSP) dedicated to an artificial intelligence. The artificial intelligence software may be executed by collaboration among processing circuits freely selected from the above examples.

The following configurations are derivable in view of the foregoing embodiments.

An information processing method according to an aspect of the present disclosure (Aspect 1) is implemented by a computer, and includes inputting a first piece of sound source data representative of a first sound source, a first piece of style data representative of a first performance style, and first synthesis data representative of first sounding conditions into a synthesis model generated by machine learning; generating, using the synthesis model, first feature data representative of acoustic features of a first target sound of the first sound source to be generated in the first performance style and according to the first sounding conditions; and generating a first audio signal corresponding to the first target sound using the generated first feature data.

In this aspect, the sound source data, the synthesis data and the style data are input into the well-trained synthesis model, to generate the feature data representative of acoustic features of the target sound. This allows the target sound to be generated without voice units. In addition to the source data and the synthesis data, the style data are input to the synthesis model. It is possible to generate the feature data of various sounds corresponding to each combination of a sound source and a performance style, without preparation of each piece of source data corresponding to each performance style, necessary in a configuration for generating feature data by inputting source data and synthesis data to the synthesis model M.

In one example (Aspect 2) of Aspect 1, the first sounding conditions include a pitch of each note included in the first synthesis data.

Furthermore, in one example (Aspect 3) of Aspect 1 or 2, the first sounding conditions include a phonetic identifier of each note included in the first synthesis data. The sound source in the third aspect is a singer.

In one example (Aspect 4) of any one of Aspects 1 to 3, the first piece of sound source data to be input into the synthesis model is selected by a user from among a plurality of pieces of sound source data, each piece corresponding to a different sound source.

According to the aspect, as an example, it is possible to generate the feature data of the target sound of a sound source suitable to a user's intention or preference.

In one example (Aspect 5) of any one of Aspects 1 to 4, the first piece of style data to be input into the synthesis model is selected by a user from among a plurality of pieces of style data, each piece corresponding to a different performance style.

According to this aspect, as an example, it is possible to generate the feature data of the target sound in a performance style suitable for a user's intention or preference.

The information processing method according to one example (Aspect 6) of any one of aspects 1 to 5 further includes inputting a second piece of sound source data representative of a second sound source, a second piece of style data representative of a second performance style corresponding to the second sound source, and second synthesis data representative of second sounding conditions into the synthesis model; generating, using the synthesis model, second feature data representative of acoustic features of a second target sound of the second sound source to be generated in the second performance style and according to the second sounding conditions; generating a second audio signal corresponding to the second target sound using the generated second feature data; and updating the second sound source data and the synthesis model to decrease a difference between known feature data and the second feature data, wherein the known feature data relates to a sound generated by the generated second audio signal.

According to this aspect, even if the new synthesis data and acoustic signals for the new sound source are not sufficiently available, it is possible for the re-trained synthesis model M to robustly generate high-quality target sound for the new sound source.

In one example (Aspect 7) of any one of Aspects 1 to 6, the sound source data represents a vector in a first space representative of relations between acoustic features of sounds generated by different sound sources, and the style data represents a vector in a second space representative of relations between acoustic features of sounds generated in different performance styles.

According to this aspect, it is possible for the synthesis model M to generate feature data of an appropriate synthesized sound suitable for a combination of a sound-output source and a performance style, by use of the following (i) and (ii): (i) the sound source data expressed in terms of the relations between acoustic features of different sound-output sources, and (ii) the style data expressed in terms of the relations between acoustic features of different performance styles.

In one example (Aspect 8) of any one of Aspects 1 to 7, the synthesis model includes a first generative model configured to generate a series of fundamental frequencies of the first target sound; and a second generative model configured to generate a series of spectrum envelopes of the first target sound in accordance with the series of fundamental frequencies generated by the first generative model.

According to this aspect, the synthesis model includes the first generative model that generates a series of fundamental frequencies of the target sound; and the second generative model that generates a series of spectrum envelopes of the target sound. This provides explicit learning of relations between (i) an input including the sound-output source, the style data and the synthesis data, and (ii) the series of the fundamental frequencies.

In one example (Aspect 9) of Aspect 8, the information processing method further includes editing the series of fundamental frequencies generated by the first generative model in response to an instruction from a user, in which the second generative model generates the series of spectrum envelopes of the first target sound in accordance with the edited series of fundamental frequencies.

According to this aspect, the series of spectrum envelopes are generated by the second generative model in accordance with the edited series of fundamental frequencies according to the instruction from the user. This allows the generation of the target sound of which temporal transition of the fundamental frequencies reflects the user's intention and preference.

Each aspect of the present disclosure is achieved as an information processing system that implements the information processing method according to each foregoing embodiment, or as a program that is implemented by a computer for executing the information processing method.

DESCRIPTION OF REFERENCE SIGNS

100 . . . information processing system, 11 . . . controller, 12 . . . memory, 13 . . . input device, 14 . . . sound output device, 21 . . . synthesis processor, 22 . . . signal generator, 23 . . . learning processor, 24 . . . feature analyzer, 26 . . . editing processor, M . . . synthesis model, Xa . . . singer data, Xb . . . style data, Xc . . . synthesis data, Z . . . input data, Q . . . feature data, V . . . audio signal, Fa and Fb . . . ID information, Ea and Eb . . . encoding model, L and Lnew . . . training data.

What is claimed is:

1. An information processing method implemented by a computer, the method comprising:

providing a first piece of sound source data, which has been obtained by encoding first identification data that identifies a first sound source, wherein the first piece of sound source data represents acoustic features of the first sound source, represented as a first embedding vector in a first multidimensional space;

providing a first piece of style data, which has been obtained by encoding second identification data that identifies a first performance style, wherein the first piece of style data represents acoustic features of sound generated by the first sound source in the first performance style, represented as a first embedding vector in a second multidimensional space;

generating, using a synthesis model generated by machine learning, first feature data representative of acoustic features of a first target sound of the first sound source to be generated in the first performance style and according to first sound conditions, by inputting into the synthesis model:

the first piece of sound source, the first piece of style data, and first synthesis data representative of the first sounding conditions; and generating a first audio signal corresponding to the first target sound using the generated first feature data.

2. The information processing method according to claim 1, further comprising:

providing a second piece of sound source data, which has been obtained by encoding third identification data that identifies a second sound source, wherein the second piece of sound source data represents acoustic features of the second sound source, represented as a second embedding vector in the first multidimensional space;

providing a second piece of style data, which has been obtained by encoding fourth identification data that identifies a second performance style, wherein the second piece of style data represents acoustic features of sound generated by the second sound source in the second performance style, represented as a second embedding vector in the second multidimensional space;

generating, using the synthesis model, second feature data representative of acoustic features of a second target sound of the second sound source to be generated in the second performance style and according to second sounding conditions, by inputting into the synthesis model:

the second piece of sound source data, the second piece of style data, and second synthesis data representative of the second sounding conditions;

generating a second audio signal corresponding to the second target sound using the generated second feature data; and updating the second sound source data and the synthesis model to decrease a difference between known feature data and the second feature data, wherein the known feature data relates to sound generated by the generated second audio signal.

3. The information processing method according to claim 2, wherein:

the first embedding vector and the second embedding vector in the first multidimensional space represent relations between acoustic features of sounds generated by different sound sources, and the first embedding vector and the second embedding vector in the second multidimension space represent relations between acoustic features of sounds generated in different performance styles.

4. The information processing method according to claim 2, wherein:

the first performance style represented by the first piece of style data includes a first sound-output environment and a first recording environment, and the second performance style represented by the second piece of style data includes a second sound-output environment and a second recording environment.

5. The information processing method according to claim 1, wherein the synthesis model includes:

a first generative model configured to generate a series of fundamental frequencies of the first target sound; and a second generative model configured to generate a series of spectrum envelopes of the first target sound in accordance with the series of fundamental frequencies generated by the first generative model.

6. The information processing method according to claim 5, further comprising:

editing the series of fundamental frequencies generated by the first generative model in response to an instruction from a user, wherein the second generative model generates the series of spectrum envelopes of the first target sound in accordance with the edited series of fundamental frequencies.

7. The information processing method according to claim 1, wherein the first sounding conditions include a pitch of each note included in the first synthesis data.

8. The information processing method according to claim 1, wherein the first sounding conditions include a phonetic identifier of each note included in the first synthesis data.

9. The information processing method according to claim 1, wherein the first piece of sound source data to be input into the synthesis model is selected by a user from among a plurality of pieces of sound source data, each piece corresponding to a different sound source.

10. The information processing method according to claim 1, wherein the first piece of style data to be input into the synthesis model is selected by a user from among a plurality of pieces of style data, each piece corresponding to a different performance style.

11. The information processing method according to claim 1, wherein:

the first identification data represents a first series of numeric values, and the second identification data represents a second series of numeric values.

12. The information processing method according to claim 1, wherein:

the first sound source is a user, and the acoustic features of the first sound source represent voice qualities of the user.

13. An information processing system comprising:

at least one memory storing a program; and at least one processor that implements the program to:

provide a piece of sound source data, which has been obtained by encoding first identification data that identifies a sound source, wherein the piece of sound source data represents acoustic features of the sound source, represented as an embedding vector in a first multidimensional space;

provide a piece of style data, which has been obtained by encoding second identification data that identifies a performance style, wherein the piece of style data represents acoustic features of sound generated by the sound source in the performance style, represented as an embedding vector in a second multidimensional space;

generate, using a synthesis model generated by machine learning, feature data representative of acoustic features of a target sound of the sound source to be generated in the performance style and according to sound conditions, by inputting into the synthesis model:

the piece of sound source data, the piece of style data, and generate an audio signal corresponding to the target sound using the generated feature data.

14. A non-transitory medium storing a program executable by a computer to execute a method comprising:

providing a piece of sound source data by encoding first identification data that identifies a sound source, wherein the piece of sound source data represents acoustic features of the sound source, represented as an embedding vector in a first multidimensional space;

providing a piece of style data by encoding second identification data that identifies a performance style, wherein the piece of style data represents acoustic features of sound generated by the sound source in the performance style, represented as an embedding vector in a second multidimensional space;

generating, using a synthesis model generated by machine learning, feature data representative of acoustic features of a target sound of the sound source to be generated in the performance style and according to sound conditions, by inputting into the synthesis model:

the piece of sound source data, the piece of style data, and synthesis data representative of the sounding conditions; and generating an audio signal corresponding to the target sound using the generated feature data.

* * * * *